United States Patent
Poma et al.

(10) Patent No.: US 8,615,964 B1
(45) Date of Patent: Dec. 31, 2013

(54) POST DESIGN FOR CORROSION RESISTANCE RAILING AND METHOD FOR INSTALLATION

(75) Inventors: Frank Poma, Port St. Lucie, FL (US); Jason F. Poma, Port St. Lucie, FL (US)

(73) Assignee: Poma & Sons, Inc., Palm City, FL (US)

( * ) Notice: Subject to any disclaimer, the term of this patent is extended or adjusted under 35 U.S.C. 154(b) by 227 days.

(21) Appl. No.: 12/436,305

(22) Filed: May 6, 2009

Related U.S. Application Data

(63) Continuation-in-part of application No. 11/425,591, filed on Jun. 21, 2006, now Pat. No. 8,282,083.

(51) Int. Cl.
*E04B 1/00* (2006.01)

(52) U.S. Cl.
USPC ......... 52/741.15; 52/745.12; 52/296; 52/298; 256/65.01; 256/59; 256/65.14; 256/65.11; 256/65.02

(58) Field of Classification Search
USPC .......... 256/1, 12.5, 21, 22, 24, 25, 26, 27, 34, 256/65.01, 67, 65.02, 65.14, 59, 65.11, 256/DIG. 5; 52/184, 296, 301, 300, 720.2, 52/298, 741.15, 745.12
See application file for complete search history.

(56) References Cited

U.S. PATENT DOCUMENTS

| | | | |
|---|---|---|---|
| 3,698,564 A * | 10/1972 | Muller ................... | 211/119.003 |
| 3,810,339 A | 5/1974 | Russo | |
| 3,835,615 A | 9/1974 | King, Jr. | |
| 3,893,271 A | 7/1975 | Kotlarz | |
| 3,918,686 A * | 11/1975 | Knott et al. ...................... | 256/59 |
| 4,930,284 A | 6/1990 | Falco | |
| 4,958,807 A * | 9/1990 | Wylie ......................... | 256/65.03 |
| 5,807,051 A | 9/1998 | Heminger | |
| 5,888,334 A | 3/1999 | Abraham | |
| 6,141,928 A * | 11/2000 | Platt ............................... | 52/296 |
| 6,311,957 B1 | 11/2001 | Driscoll et al. | |
| 6,467,756 B1 * | 10/2002 | Elsasser ..................... | 256/65.14 |
| 6,484,471 B2 | 11/2002 | Steed et al. | |
| 6,643,982 B1 * | 11/2003 | Lapp et al. .................. | 52/127.2 |
| 6,702,259 B2 * | 3/2004 | Pratt .......................... | 256/65.03 |
| 6,758,460 B1 * | 7/2004 | Driscoll et al. ............ | 256/65.05 |
| 7,124,545 B1 | 10/2006 | Poma et al. | |
| 2004/0026679 A1 * | 2/2004 | Terrels et al. .............. | 256/65.03 |
| 2004/0177586 A1 | 9/2004 | McLean | |
| 2006/0065885 A1 * | 3/2006 | Stanley .......................... | 256/59 |

FOREIGN PATENT DOCUMENTS

JP 2005213740 8/2005

* cited by examiner

*Primary Examiner* — Chi Q Nguyen
(74) *Attorney, Agent, or Firm* — Malin Haley DiMaggio & Bowen, P.A.

(57) ABSTRACT

An improved mounting structure for the posts of hand rail systems including a mounting arm member positioned within a sleeve monolithically formed within the inner chamber of the post. The sleeve includes a slit that allows for the outflow of water, thereby limiting corrosion and degrading of the post and mounting structure. A series of nubbed projections create grooves within the surface of the sleeve, to secure the mounting arm into the sleeve in a strong manner. A secure fit limits the amount of liquid trapped within the sleeve reducing corrosion. The mounting arm has smaller dimensions, reducing the chances that the arm comes into contact with support rods embedded within the concrete during installation. By avoiding contact with the support rods, concrete spalling is dramatically reduced, adding to the lifetime of the rail system.

21 Claims, 5 Drawing Sheets

POST DESIGN FOR CORROSION RESISTANCE RAILING AND METHOD FOR INSTALLATION

CROSS REFERENCE TO RELATED APPLICATIONS

This application is a continuation-in-part of application Ser. No. 11/425,591 filed Jun. 21, 2006 now U.S. Pat. No. 8,282,083.

STATEMENT REGARDING FEDERALLY SPONSORED RESEARCH OR DEVELOPMENT

N/A

BACKGROUND OF THE INVENTION

1. Field of the Invention

The present invention relates to a handrail post, and more particularly to an improved corrosion resistant post design for use in supporting a corrosion resistant handrail.

2. Description of Related Art

The aluminum handrail industry suffers from a serious problem. Hundreds of millions of dollars are spent each year on repairing concrete balcony edges and replacing railings due to the corrosion that occurs when aluminum is embedded in concrete in a harsh (beach or salty) environment. The problem arises because the concrete balcony edges are reinforced with steel reinforcement bars. These reinforcement bars are located between 1.5"-2" from the edge of the concrete slab. Typically, when installing an aluminum handrail, a post must be embedded into the concrete. Thus, it is necessary to drill a large hole, which oftentimes cuts or contacts the steel reinforcements. Consequently, when the aluminum posts are installed, they are in contact with the steel reinforcement bars and cause a galvanic reaction, in which the aluminum becomes the sacrifice metal and expands. When the aluminum expands, it begins to disintegrate and the surrounding concrete spalls.

Most bases around the aluminum post are composed of gypsum, which deteriorates over time. When the posts are used in a coastal setting, the deterioration produces a pocket and allows for saltwater intrusion. When this occurs, the surrounding concrete becomes less alkaline and causes the reinforcement to expand and form hairline fractures in the concrete. When moisture seeps into the pocket around the post, the aluminum oxidizes and expands. The combination of these effects creates a safety issue because the concrete loses strength and structure.

Several attempts to create further stability in the handrail business have been presented. For example, U.S. Patent Application number 2004/0177586 published by McLean on Sep. 16, 2004 is entitled BALUSTER RETAINING MEMBER. This patent application discloses a baluster retaining member for connecting the end of a baluster to an opening in a rail of a railing system. The rail and baluster sections are oriented with respect to one another at an angle so that when the baluster is connected to the rail by the member and the rail is positioned for use adjacent a stairway at an angle from the horizontal, the baluster is oriented vertically.

U.S. Pat. No. 6,484,471 issued to Steed on Nov. 26, 2002 is entitled ADHESIVE FIXED ANCHORS. An anchoring member is disclosed for anchoring an object to a supporting surface having a bore for receiving the anchoring member. The anchoring member comprises an elongate cylindrical body having a penetrating end arranged to be embedded in the bore and an exposed end opposite the penetrating end. An adhesive compound arranged to be coated about the penetrating end of the body secures the body within the bore.

U.S. Pat. No. 6,311,957 issued to Driscoll et al. on Nov. 6, 2001 is entitled DEVICE AND METHOD FOR ATTACHING BALUSTERS. This patent is related to a device for attaching a polygonal baluster end to a handrail or base. This device includes a connector which is generally cylindrical. This connector also defines an internal axial channel having a polygonal cross-section. The axial channel is adapted to receive the polygonal baluster end.

U.S. Pat. No. 5,888,334 issued to Abraham on Mar. 30, 1999 is entitled METHOD OF INDICATING THE LOCATION AND DEPTH OF AN ANCHOR IN A HOLE IN A SUBSTRATE AND DRILLING THROUGH FILL MATERIAL TO THE ANCHOR. The invention is a fixture that can be readily mounted to a surface by embedding and adhering an internally threaded anchoring element in a hole in the surface. The fixture can then be removed and replaced or the fixture can be removed and the hole covered. The end of the fixture is also threaded so that it firmly attaches to the anchor.

U.S. Pat. No. 5,807,051 issued to Heminger on Sep. 15, 1998 is entitled DIELECTRIC ADHESIVE INSERT ANCHOR, and discloses a dielectric adhesive insert anchor including an anchor body and a screw member for insertion into a drilled hole in a substrate containing an adhesive. A friction segment includes an internally threaded cavity in which to receive a screw member. An adhesion segment includes a cylindrical section and a plurality of saucer-shaped buttons positioned along its length ending with a terminal button. Both the anchor member and screw members are preferably constructed of carbon steel or stainless steel.

U.S. Pat. No. 4,930,284 issued to Falco on Jun. 5, 1990 is entitled MASONRY ANCHOR. This patent teaches a masonry fastening system in which a porous sleeve filled with a hardenable adhesive mass is inserted in a hole interconnecting two or more masonry elements with an anchoring pin having a tapered or conical shape, the anchoring pin being insertable into the sleeve, through the hardenable mass.

U.S. Pat. No. 3,893,271 issued to Kotlarz on Jul. 8, 1975 is entitled BASIC BEAM STRUCTURAL MEMBER AND STRUCTURES BUILT THEREFROM. The '271 patent relates to a high-strength, lightweight, basic beam of a single shape which can serve as a column, truss, girder, jamb or other structural member whereby an entire structure can be built using the same basic beam for all of the structural members. The basic structure comprises a unitary, elongated rigid beam having a pair of parallel, opposed channel-shaped portions connected by a pair of spaced walls positioned inwardly from the sides of the channels to define a longitudinally extending slot therebetween and a pair of opposed recesses.

U.S. Pat. No. 3,835,615 issued to King, Jr. on Sep. 17, 1974 is entitled FASTENER JOINT CONSTRUCTION. This reference illustrates a joint assembly including work pieces with aligned holes of a prescribed diameter therethrough, a fastener in the holes and having a shank portion a prescribed amount less in diameter than the holes, and a metal sleeve member positioned between the shank portion of the fastener and the work pieces within the holes and in bearing contact with both the shank portion and the work pieces.

Finally, U.S. Pat. No. 3,810,339 issued to Russo on May 14, 1974 is entitled METHOD AND APPARATUS FOR FORMING CONSTRUCTION ELEMENT LOCATING AND MOUNTING VOIDS IN A POURED CONCRETE STRUCTURE, and illustrates an assembly comprised of desirably spaced sleeves interconnected to a framework within a concrete form by means of noncorrosive studs protruding from the base of each sleeve. The sleeves provide receptacles for mounting guardrails.

However, none of the prior art references, either alone or in combination with one another, teach or suggest the particular solutions to the problems addressed by the instant invention.

Accordingly, what is needed in the guardrail and handrail industry are improved rail designs and embed systems that further remove the possibilities of corrosion and concrete spalling, thus increasing the length of the life and safety of the balcony and guardrail. It is, therefore, to the effective resolution of the aforementioned problems and shortcomings of the prior art that the present invention is directed. However, in view of the guardrail and handrail systems in existence at the time of the present invention, it was not obvious to those persons of ordinary skill in the pertinent art as to how the identified needs could be fulfilled in an advantageous manner.

BRIEF SUMMARY OF THE INVENTION

The present invention contemplates an improved and modified railing system which is corrosion resistant, as well as a method for the installation. The system designs are applicable to both new construction and the repair of existing rail systems. The parent application Ser. No. 11/425,591 describes a rail system that limits the possibility of corrosion and concrete spalling by providing a stainless steel or aluminum insert with a mounting arm that is used for the mounting of the post of a guardrail system. The mounting arm is coupled to the insert which is positioned within the post, such that the mounting arm protrudes out from the bottom of the post. The stainless steel insert includes a channel to allow for the drainage of water from the post, thereby preventing the corrosion of the rail system. The invention is also rigid enough to allow for a smaller mounting arm than the prior art. In using a smaller mounting arm, the dimensions of the mounting hole within the concrete substrate can be reduced, ensuring that the post does not make contact with reinforcement bars. The invention further includes a method for installing rail systems that limits the spalling of the concrete substrate. The method includes securing the mounting arm of the post within a hole in a concrete substrate using an epoxy or acrylic that is impervious to water and does not contract and expand over time.

The instant invention is an improved mounting arm and post design for the mounting of a post within a rail system. The post can be any elongate shape as long as necessary support is provided for the post during mounting including but not limited to square, triangular, rectangular, oval, pentagonal, sextagonal, septagonal, octagonal, decagonal or other polygonal shape. The post is hollow and contains a receiving sleeve that extends through the center of the empty contained chamber within the post. The sleeve is monolithically formed and supported as part of the post through structural webbing that extends within the contained interior chamber between the outer surface of the sleeve and the inner surface of the post.

The sleeve contains a slit that extends the entire longitudinal length of the sleeve, such to allow for the seepage of water and the removal of shavings from within the sleeve. A mounting arm fits within and is coupled to the sleeve, such that a portion of the mounting arm extends out from the bottom of the post. A nubbed/nureled patterned projection protrudes from the outer surface of the mounting arm and is used to rigidly secure the mounting arm into position within the sleeve. The patterned projection is self-tapping and can be helical, helix like, double helix like, random, parallel circles, or circumferentially discontinuous ridges as is adequate for securing the mounting arm within the sleeve. The mounting arm can be press fit or rotationally screwed into the sleeve, wherein the projected pattern creates grooves within the inner surface of the sleeve. In an alternative embodiment, the mounting arm is press fit or set screwed into a sleeve with or without preexisting complimentary threads for receiving the projections extending from the mounting arm. The extended portion of the mounting arm may include a notch to promote bonding during the process of embedding the post within concrete. The mounting arm may also be secured to the sleeve with adhesives, by welding or with a pinned device.

In an alternate embodiment of the present invention, the insert is generally made from aluminum and is formed into the same shape as the inner chamber within the post. The insert includes a receiving aperture in which the mounting arm is inserted. A slit extends through the insert along its longitudinal length to allow for the out flow of water, and the removal of shavings from within the receiving aperture of the insert. The mounting arm is placed into and secured within the aperture of the insert though the same means as previous embodiments, including but not limited to press fitting or rotationally screwing in the mounting arm, such that the mounting arm extends from the bottom end of the insert. The mounting arm includes nubbed projections protruding from the outer surface of the mounting arm in various patterns including but not limited to a helical, helix like, double helix like, random, parallel circle, or circumferentially discontinuous ridge patterns. The mounting arm also includes a notch at the bottom to promote bonding during the mounting process. The mounting arm can be threaded into the receiving insert through existing complimentary threading grooves, or can be forced into the receiving insert, creating grooves in the insert using the nubbed projections of the mounting arm.

Once the mounting arm is coupled within the insert, the insert with the attached extending mounting arm is pushed into and rigidly secured within the contained space within the post, such that the mounting arm projects out from the bottom of the post. The insert is secured within the post through any suitable means including but not limited to welding, screwing, pinning, press-fitting and adhesive.

The preferred method of mounting the post involves drilling a hole into a concrete substrate. The hole made should be between one and one and a half inches in diameter, but may be larger, and have a depth of between 2 and 3 and one half inches, or deeper if necessary, depending on the load requirement and field conditions of the post. Drilling a hole with such a small diameter prevents unwanted contact with the reinforcement bars, improves the fit and finish, simplifies installation and insures proper edge distance.

The mounting arm is then inserted into the drilled hole and is secured with an epoxy or an acrylic adhesive which does not deteriorate over time as with concrete. Further, the epoxy or acrylic is impervious to water. The epoxy or acrylic used should not and will not expand or contract within the concrete. The epoxy or acrylic permanently bonds with both the concrete and the stainless steel insert and this property prevents saltwater intrusion.

In accordance with the instant invention, it is an object thereof to provide an improved corrosion resistant railing system and method for installation.

It is a further object to provide a corrosion resistant railing system that allows water or moisture to escape or seep from within the post.

It is a further object to provide a corrosion resistant railing system that will not cause the rust stains usually present with traditional drilling methods.

It is a further object to provide a corrosion resistant railing system that prevents water intrusion into the grout pocket eliminating the risk of corrosion of the rebar.

It is a further object to provide corrosion resistant railing system that will not cause galvanic reaction and spall the concrete.

It is a further object to provide a corrosion resistant railing system that is cost effective and operationally efficient.

It is a further object to provide a corrosion resistant railing system that is strong and durable allowing for increased safety and longevity.

Finally, it is an object to provide a corrosion resistant railing system that provides all of the above mentioned features and objectives.

These objects and advantages along with others will become evident in the following description and claims as set forth hereinafter.

DETAILED DESCRIPTION OF THE INVENTION

Figure 2:
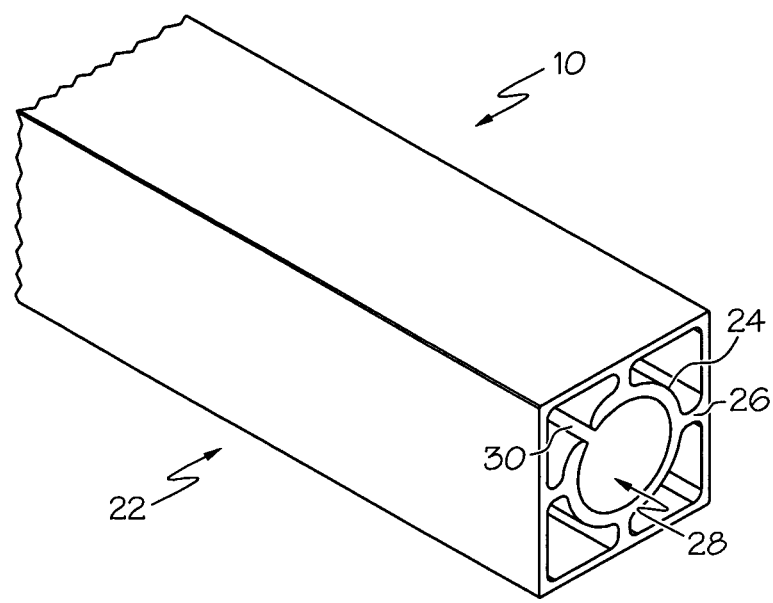
FIG. 2 is a perspective view of the post and receiving sleeve without the mounting arm inserted in the sleeve in accordance with the preferred embodiment of the instant invention.
Figure 3:
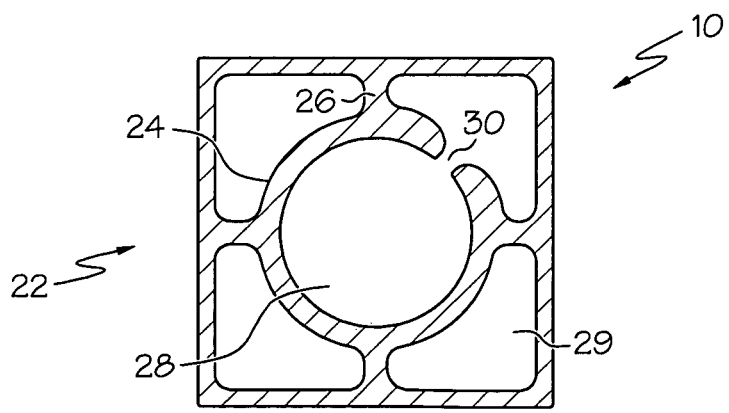
FIG. 3 is a cross sectional view of the post and receiving sleeve without the mounting arm inserted in the sleeve in accordance with the preferred embodiment of the instant invention.

With reference to the drawings, FIGS. 2-8 depict the preferred and alternative embodiments of the instant invention which is generally referenced as a railing system and, or by numeric character 10. The instant invention 10 comprises an improved and modified railing system that is corrosion resistant, as well as a method for installation of the railing system 10. The railing system 10 of the instant invention is adapted for use with both new construction and the repair of existing rail systems. The railing system 10 comprises an improved mounting arm 32 and post 22 assembly adapted for mounting a post 22 within the rail system 10 so as to resist corrosion, as shown in FIGS. 2-6. Referring to FIGS. 2 and 3, the post 22 is hollow and comprises a receiving sleeve housing 24 with a sleeve passageway 28 that extends through the post 22. The sleeve housing 24 is monolithically formed and supported as part of the post 22 by structural webbing 26 that extends between the outer surface of the sleeve 24 and the inner surface of the post 22. The mounting arm 32 fits within the sleeve passageway 28 and is coupled to the sleeve housing 24 with a portion of the mounting arm 32 extending out from the bottom of the post 22. A nubbed/nureled patterned projection 34 protrudes from the outer surface of the mounting arm 32 to rigidly secure the mounting arm 32 into position within the sleeve housing 24.

Figure 1:
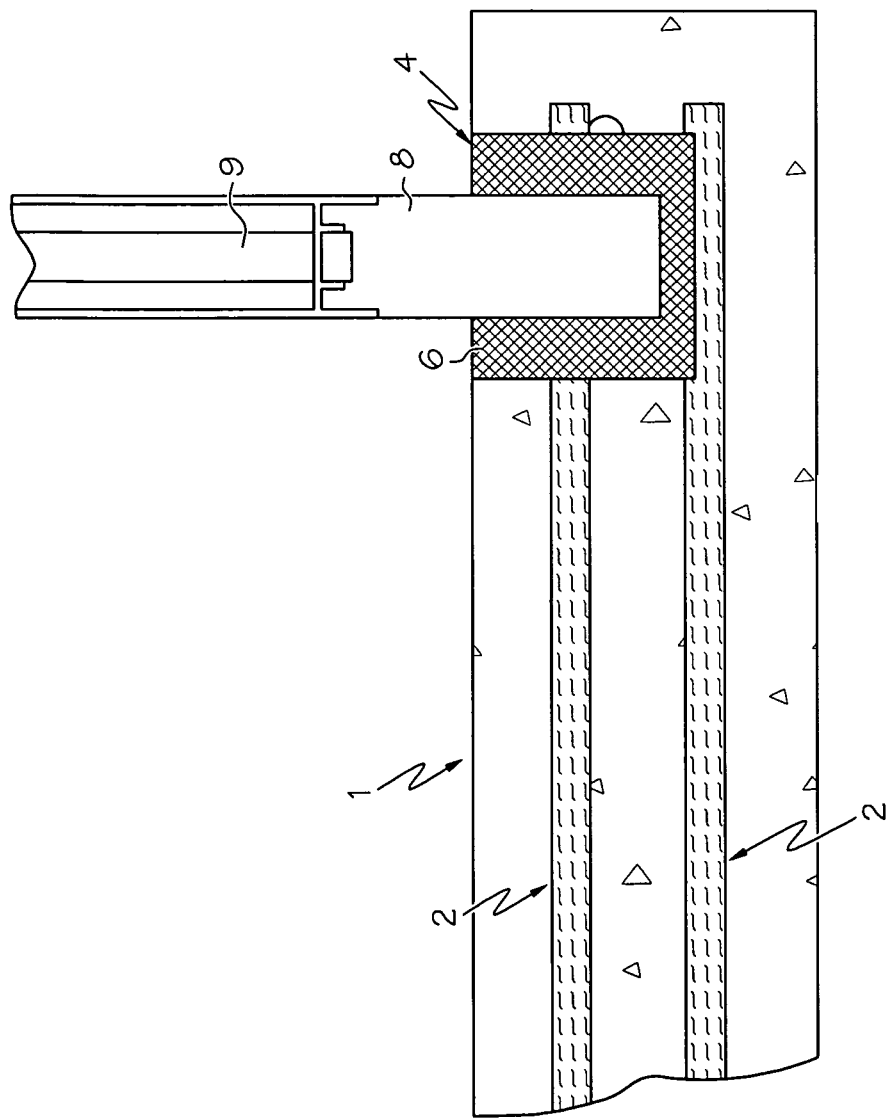
FIG. 1 is a cross sectional view of a railing as found in the prior art.

The instant invention 10 comprises an improvement over the prior art, such as that shown in FIG. 1. With reference to FIG. 1, the prior art consists of a railing post 8 that is inserted into a concrete balcony slab 1. The railing post 8 typically comprises aluminum. A hole 4 around four inches in diameter and three and a half inches in depth is drilled into a concrete slab 1 in order to insert the railing 8. The drilled hole 4 should be and must be drilled as close to the edge of the concrete slab 1 as possible. The aluminum railing post 8 is secured within the hole 4 through the use of hydraulic or gypsum based cement 6. When drilling the hole 4, steel reinforcement bars 2 often obstruct the path of the drill bit and are unavoidably and accidentally cut allowing the aluminum post 8 to come in contact with the steel reinforcement bars 2. When aluminum contacts steel directly a galvanic reaction occurs causing the aluminum post 8 to expand. When the aluminum post 8 expands, the surrounding concrete 6 begins to spall, which causes the aluminum post 8 to disintegrate. However, the bigger problem is the intrusion of water in the grout pocket 4 and the subsequent loss of alkalinity, causing the reinforcement bars 2 to corrode. The instant invention 10 addresses these problems by preventing the aluminum post from coming in contact with steel reinforcement bars 2 and allowing water and moisture to escape from within the post.

In accordance with the prior art, the type of aluminum used for railing varies, but always comprises an alloy. For structural extrusions, such as posts, the type of aluminum used is 6061-T6 or 6005-T5 Alloy/Temper. For all other extrusions, such as caps, pickets, mid and bottom rails, the preferred aluminum is at least 6063-T5. For castings, the aluminum used must be high quality prime material or materials remelted from a prime extrusion. The grout 6 typically used is non-shrink, nonmetallic grout or erosion resistant anchoring cement.

Posts 8 are often anchored into concrete with preset sleeves in the concrete slab 1. After a post 8 is inserted into the sleeve, the space between the post and sleeve is filled with an anchoring material 6. Posts 8 are anchored into concrete by core drilling holes at least 3" deep and 1" wider than the outside diameter of the post 8. The holes 4 are cleaned of all loose material prior to inserting the posts 8 and adding the anchoring material 6. The preferred anchoring material 6 is typically non-shrink, nonmetallic grout or anchoring cement. The anchoring material 6 terminates approximately ½" from the top of the hole 4 and is covered with a waterproof material matching the surrounding areas and tapered away from the post 8.

A common problem experienced in the prior art is the deterioration of the gypsum-based material or cementitious grout filler 6 surrounding the aluminum post 8. When the anchoring material 6 deteriorates, it forms a vacant pocket around the post 8 allowing moisture or liquid to enter. Oftentimes, these types of railings are used in coastal settings and are thus subject to infiltration by saltwater. When saltwater invades the hole 4, the surrounding concrete slab 1 becomes less alkaline in nature. When the concrete slab 1 becomes less alkaline, the reinforcement bars 2 expand due to corrosion. When the reinforcement bars 2 expand, the concrete 1 begins to form hairline cracks which allow further intrusion of saltwater causing more spalling. As the spalling spreads it reduces the structural integrity of the concrete slab 1, causing the aluminum railing 18 to become loose and fall off.

Figure 4:
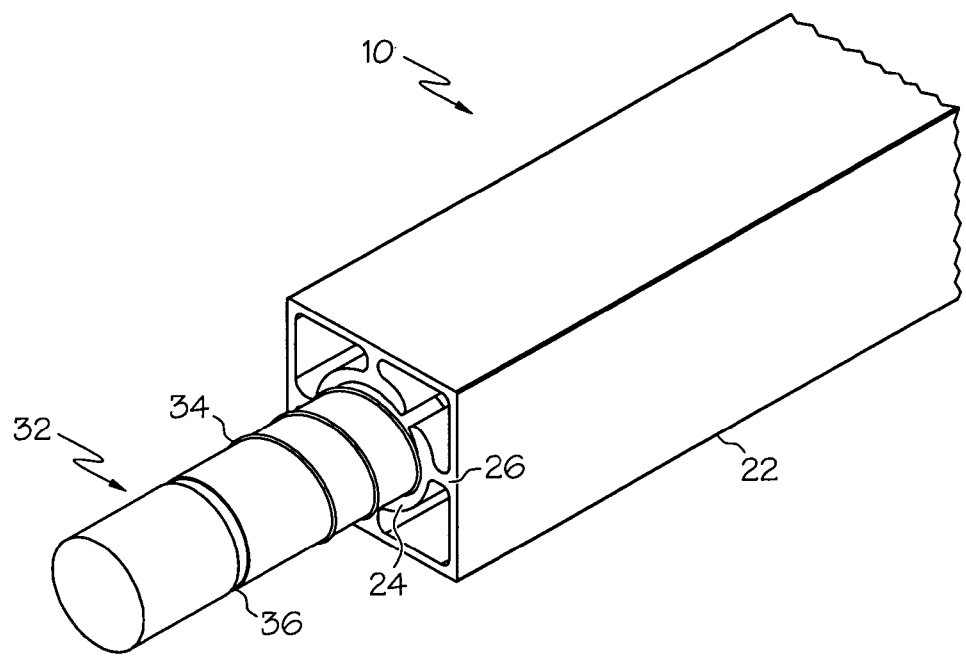
FIG. 4 is a perspective view of the post with the mounting arm inserted in the receiving sleeve in accordance with the preferred embodiment of the instant invention.
Figure 6:
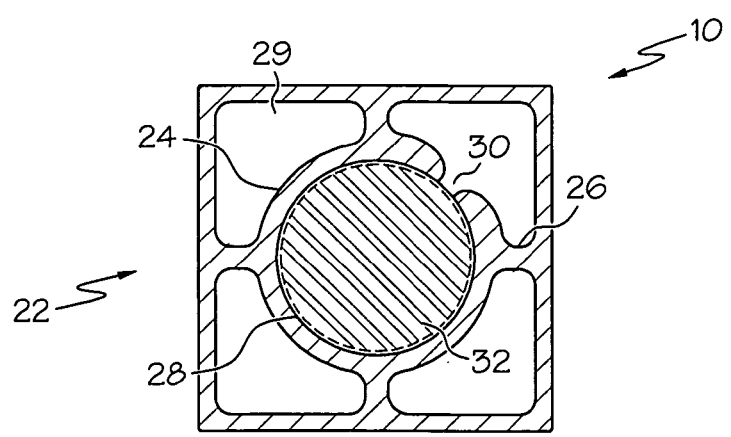
FIG. 6 is a cross sectional plan view of the post with the mounting arm inserted in the receiving sleeve in accordance with the preferred embodiment of the instant invention.
Figure 5:
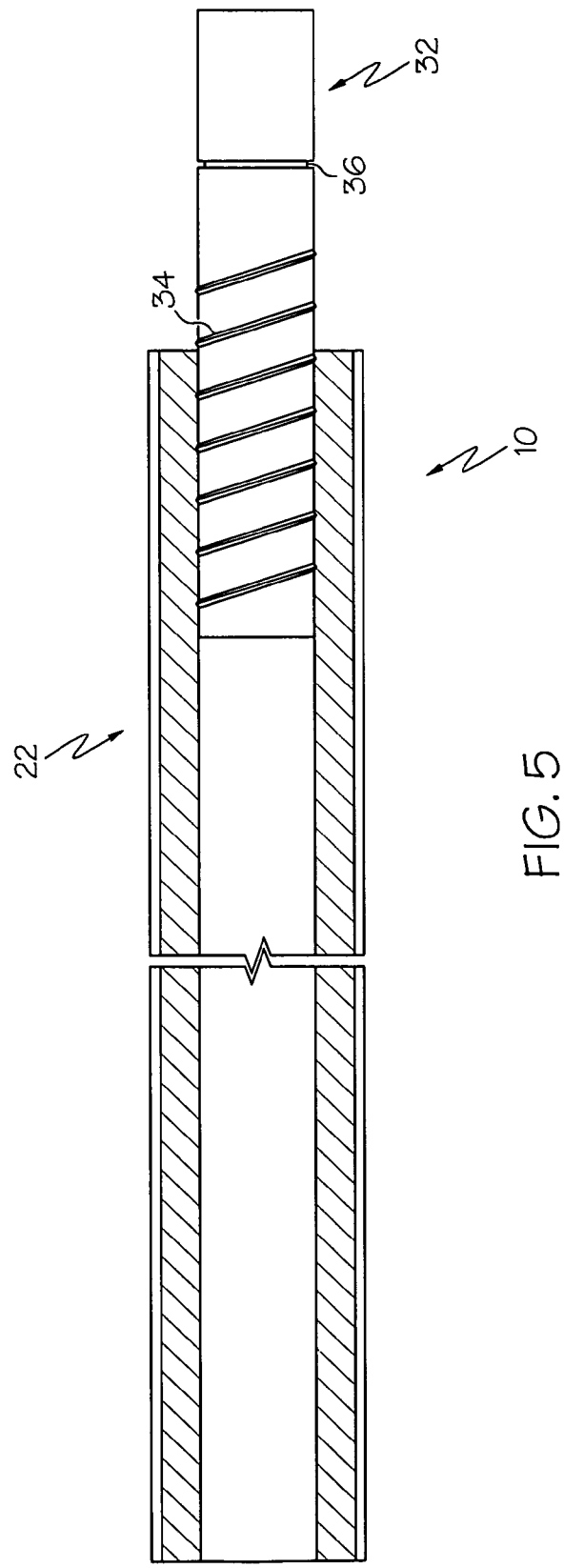
FIG. 5 is a cross sectional side view of the post with the mounting arm inserted in the receiving sleeve in accordance with the preferred embodiment of the instant invention.

With reference to FIG. 2, a perspective view of the post 22 and mounting sleeve 24 without the mounting arm 32 inserted is shown. The post 22 comprises an elongated housing structure that defines the shape of the post 22 and a sleeve housing 24 monolithically formed in and with the post 22. The sleeve housing 24 is supported as part of the post through structural webbing 26 that extends within the interior chamber of the post 22 between the outer surface of the sleeve 24 and the inner surface of the post 22. The post 22 and elongated sleeve housing 24 can be fabricated into any shape to maximize both structural integrity and aesthetic appeal, including but not limited to square, triangular, rectangular, oval, pentagonal, sextagonal, septagonal, octagonal, octagonal, or decagonal. The elongated post 22 and sleeve housing 24 are typically made from aluminum in order to minimize the weight of the railing system 10, while still providing a strong structure. The post 22 comprises a hollow area for the sleeve housing 24. The sleeve housing structure 24 comprises a hollow passageway 28 for receiving the mounting arm 32. Referring to FIGS. 2 and 3, the receiving sleeve housing 24 extends through the hollow area within the post 22 at a position that is generally through its center. The sleeve housing 24 defines a specific volume passage 28 for receiving and supporting the mounting arm 32, as shown in FIGS. 4-6. The specific volume 28 that is defined by the sleeve 24 can be, but is not limited to, circular or square, based upon the shape of the mounting arm 32 to be received.

With reference to FIGS. 4 and 6, the sleeve 24 is supported in position within the post 22 by a series of structural support members 26, also referred to as webbing 26. The support members 26 extend from the inner surfaces of the post structure 22 to the outer surface of the sleeve 24. The support members 26 extend longitudinally up the sleeve housing 24 in the main body of the post 22, forming a structural webbing. This structural webbing 26 not only supports the sleeve 24 within the post 22, but also serves to reinforce and strengthen the entire post 22. By positioning the sleeve 24 away from the inner surfaces of the post structure housing 22, channels 29 are created, which allows water and other liquids to flow out of the hollow area of the post 22. By enabling liquids to flow out of the post 22, the post 22 resists deterioration and corrosion over prolonged periods of time. The use of a monolithically attached sleeve 24 in the mounting structure for the post 22 is advantageous in that it does not require the welding, sanding, and fitting of an additional mounting component within the post 22, thereby saving time and money.

With reference to FIG. 6, the sleeve 24 comprises a slit 30. The slit 30 extends longitudinally through the entire length of the sleeve 24. The slit 30 helps to further prevent corrosion of the post 22 by providing another passageway, through which liquid can flow out from the sleeve 24. By providing a way for contained liquid to flow out from the sleeve 24, a minimum amount of water becomes trapped over time. Particularly in areas that are in close proximity to the ocean, minimizing the amount of liquid within the sleeve 24 of the post 22 dramatically reduces the amount of corrosion that occurs. The sleeve 24 defining the slit 30 is preferably made from the same material as the post 22 and support members 26 to ensure that the components are sufficiently coupled together, thereby improving the structural stability and durability of the post 22 over time.

With reference to FIGS. 4 and 5, a perspective view and cross sectional view of the post 22 supporting an inserted mounting arm 32 is shown. The mounting arm 32 comprises a solid elongate member that can be any shape as is required for supporting the post 22 and the railing system. The cross section of the mounting arm 32 is preferably circular or rectangular, but may comprise other shapes. The mounting arm 32 also comprises a patterned nubbed projection 34 that projects from the outer surface of the mounting arm 32. The nubbed projections 34 can be patterned in any way including but not limited to helical, helix like, double helix like, random, parallel circle, or circumferentially discontinuous ridge patterns.

With reference to FIG. 6, the mounting arm 32 is inserted into the empty space or passage 28 that is defined by the sleeve housing 24 within the post 22. The inner surface of the receiving sleeve 24 can either be smooth or contain a series of prefabricated complimentary receiving threads. If the inner surface of the receiving sleeve 24 is smooth, the mounting arm 32 may be inserted in the sleeve 24 using a variety of methods, including but not limited to press fitting the mounting arm 32 into the sleeve 24. The mounting arm 32 is positioned, such that the bottom of the arm 32 extends out from the bottom of the post 22. A notch, groove or the like 36 is formed in or around the mounting arm 32 proximal its lower end and in a position that resides outside the post 22 and sleeve 24. The notch 36 is used to promote proper bonding between the mounting arm 32 and the epoxy that is used to support the mounting arm 32 in the hole in the concrete substrate.

When the mounting arm 32 is press fitted or otherwise inserted and secured in the sleeve 24, the projections 34 become embedded into the inner sidewalls of the sleeve 24 inside the sleeve passage 28. As the projections 34 become embedded, material from the sidewalls of the sleeve 24 break off and exit the sleeve passage 28 through the slit 30 and channels 29. By creating vacancies within the sleeve 28 for receiving the projections 34, the mounting arm 32 incorporates potential difference gradients of spacing between the outer surface of the mounting arm 32 and the inner surface of the sleeve 24 into the construction of the system, thereby eliminating the concern for potential difference gradients in attaining a secure fit. The post 22 is more than adequately supported in a safe and effective manner by ensuring that a secure fit is created between the mounting arm 32 and the receiving sleeve 28. In addition, the secure fit of the mounting arm 32 within the sleeve 24 limits the amount of liquid that can be trapped between the mounting arm 32 and the sleeve 24, thereby limiting the onset of corrosion and ensuring that the post 22 remains securely mounted for a longer period of time.

The inner surface of the sleeve 24 may also comprise a series of prefabricated complimentary threads for receiving the nubbed projections 34 along the outer surface of the mounting arm 32. The mounting arm 32 can be inserted into the sleeve passage 28 with prefabricated complimentary threads through a number of methods, including but not limited to screwing the mounting arm 32 into the sleeve 24. By using a complimentary thread for receiving the projections 34 of the mounting arm 32, the mounting arm 32 can be secured within the sleeve 24 on site in a quick and convenient manner.

Figure 7:
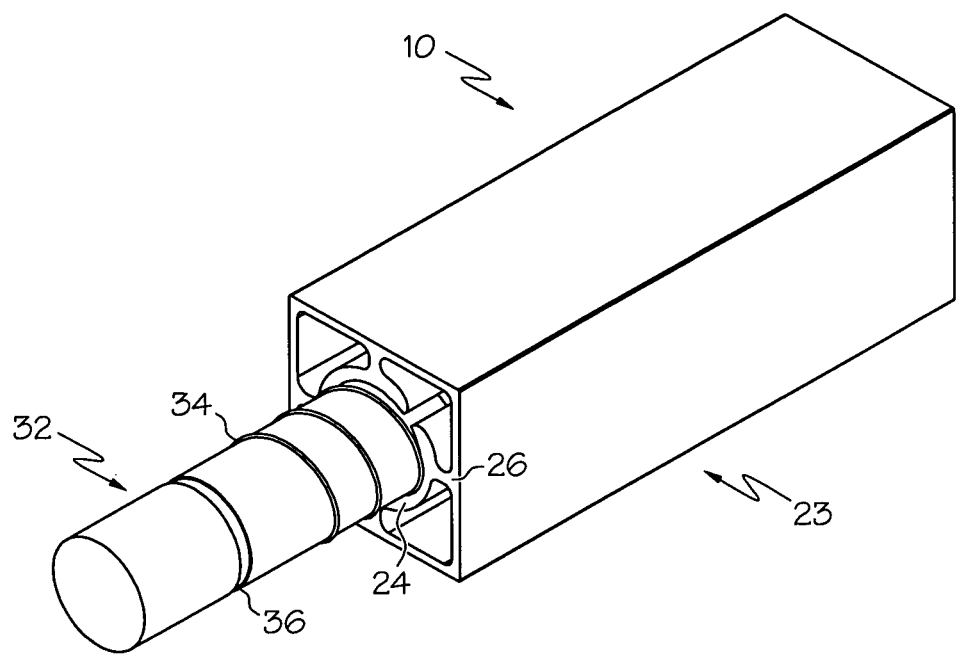
FIG. 7 is a perspective view of the post insert with the mounting arm inserted in the receiving sleeve housing in accordance with an alternative embodiment of the instant invention.
Figure 8:
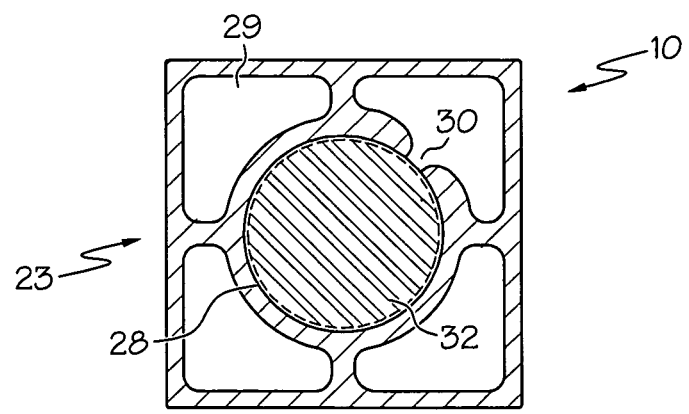
FIG. 8 is a cross sectional view of the post insert with the mounting arm inserted in the receiving sleeve housing in accordance with the alternative embodiment of the instant invention.

With reference to FIGS. 7 and 8, in an alternative embodiment of the present invention 10, the mounting arm 32 may be fitted into a separate post insert 23 resembling the sleeve 24 that is placed within the hollow area or inner chamber of the post housing 22. The post insert 23 is shaped for secure fitting and coupling within the post 22. Like the preferred embodiment, the post insert 23 comprises a sleeve housing 24 joined to the post insert housing 23 by structural support members 26. The post insert 23 also comprises channels 29 and a slit 30 defined by the sleeve housing 24 that allow for the drainage of liquid from within the post 22. The post insert 23 may comprise aluminum or either type 304 or 316 stainless steel, as type 304 and 316 stainless steel are the only alloys that are compatible with aluminum and concrete. Type 304 and 316 stainless steel does not react to alkaline and acidic conditions, even in the most corrosive environments, due to their low carbon content. It is also contemplated that the post insert 23 may be constructed of aluminum.

The sleeve housing 24 in the post insert 23 defines an inner passage 28 for receiving and supporting a mounting arm 32. As with previous embodiments, the surface surrounding the inner passage 28 can be smooth, or include complimentary threads for receiving the nubbed projections 34, of the mounting arm 32. The mounting arm 32 and projections 34 can be coupled to the insert 23 through various methods, including but not limited to press fitting or screwing. After the mounting arm 32 is inserted into the sleeve 24 in the post insert 23, it is positioned and secured within a hole in a concrete slab, such that the insert 23 is lifted above the concrete slab. The insert 23 is then fitted and secured within a post 22, thereby completing the mounting process for the post and rail system 10. Alternatively, after the mounting arm 32 is inserted into the sleeve 24 of the post insert 23, the rail insert 23 may be inserted into the post 22 before placing the free end of the mounting arm 32 into the hole in the concrete slab.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A railing support system for resisting corrosion and simplifying installation, said system comprising:
    at least one hollow post adapted for use within a railing system;
    a corrosion resistant sleeve formed in said hollow post;
    a plurality of rigid support members extending from said sleeve and integrally formed with said hollow post; said sleeve, support members and post defining a plurality of channels; and
    a corrosion resistant mounting arm permanently secured to and in said sleeve such that said mounting arm does not move relative to or in said sleeve, said mounting arm having a distal end and a threadless lower section extending to said distal end and out of said sleeve for being inserted and secured with a bonding agent in a mounting hole formed in a concrete substrate.

2. A system as recited in claim 1, wherein said sleeve comprises:
    a slit defined by a gap extending longitudinally along said sleeve for passing water and debris out of said post.

3. A system as recited in claim 2, wherein said sleeve, support members and mounting arm comprise stainless steel.

4. A system as recited in claim 2, further comprising:
    a bonding agent, said bonding agent comprising epoxy.

5. A system as recited in claim 2, further comprising:
    a bonding agent, said bonding agent comprising acrylic.

6. A system as recited in claim 1, further comprising:
    a rib projecting at least partially around an upper section of said mounting arm above said lower section for rigidly securing said mounting arm in and to said sleeve.

7. A system as recited in claim 6, wherein:
    an upper section of said mounting arm is permanently secured to said sleeve by press fitting said mounting arm and said sleeve together.

8. A system as recited in claim 1, wherein said mounting arm comprises:
    a notched groove formed in said lower section of said mounting arm for facilitating enhanced bonding with the bonding agent in the mounting hole.

9. A system as recited in claim 1, further comprising:
    said mounting arm having a threaded upper section above said lower section; and
    said sleeve having a threaded section for threadably receiving and securing said mounting arm such that said threadless lower section remains below and outside said sleeve.

10. A system as recited in claim 1, wherein said sleeve, support members, hollow post and mounting arm comprise aluminum.

11. A railing support system for resisting corrosion due to installation in concrete substrates and for simplifying installation, said system comprising:
    a housing adapted for insertion in a railing post;
    a corrosion resistant sleeve formed in said housing;
    a plurality of rigid support members extending from said sleeve and integrally formed with said housing, said sleeve, support members and housing defining a plurality of channels;
    a mounting arm permanently secured to and in said sleeve such that said mounting arm does not move relative to or in said sleeve; said mounting arm having a distal end and a lower threadless section extending to said distal end and extending out of said sleeve for placement in a hole formed in a concrete substrate; and
    means for permanently securing said mounting arm in said sleeve; said housing, mounting arm, sleeve and support member being permanently joined as an integral device.

12. A system as recited in claim 11, wherein said sleeve comprises:
    a slit defined by a gap extending longitudinally in said sleeve for passing water and debris out of said housing.

13. A system as recited in claim 12, wherein said sleeve, support members, housing and mounting arm comprise aluminum.

14. A system as recited in claim 12, wherein said sleeve, support members, housing and mounting arm securing means comprise stainless steel.

15. A system as recited in claim 11, wherein said mounting arm securing means comprises:
    means for press fitting said mounting arm and said sleeve together.

16. A system as recited in claim 11, wherein said mounting arm comprises:
    a notch formed in said lower section for facilitating enhanced bonding with a bonding agent in the mounting hole.

17. A method for installing a railing support system having a post and mounting arm, said method comprising the steps of:
    forming a hole in a concrete substrate;
    installing a mounting arm having an upper section with at least on rib projection and a threadless lower section in a sleeve housing having a housing body, a sleeve and support members such that said lower section of said mounting arm extends outside said sleeve housing, said sleeve housing being permanently disposed in a post wherein said support members extend to and are integrally formed with said post;
    securing said upper section of said mounting arm in said sleeve;
    inserting said threadless lower section of said mounting arm in said hole;

securing said threadless lower section of said mounting arm in said hole with a bonding agent;

and said threadless lower section extending to a distal end of said mounting arm; and inserting said sleeve housing in a post.

18. A method as recited in claim 17, wherein said step of securing said upper section of said mounting arm in said sleeve comprises the step of press fitting.

19. A method as recited in claim 17, wherein said step of securing said upper section of said mounting arm in said sleeve comprises the step of threading said upper section in said sleeve such that said rib projection engages a corresponding groove in said sleeve.

20. A system as recited in claim 17, further comprising:

a bonding agent, said bonding agent comprising epoxy.

21. A system as recited in claim 17, further comprising:

a bonding agent, said bonding agent comprising acrylic.

* * * * *